UNITED STATES PATENT OFFICE.

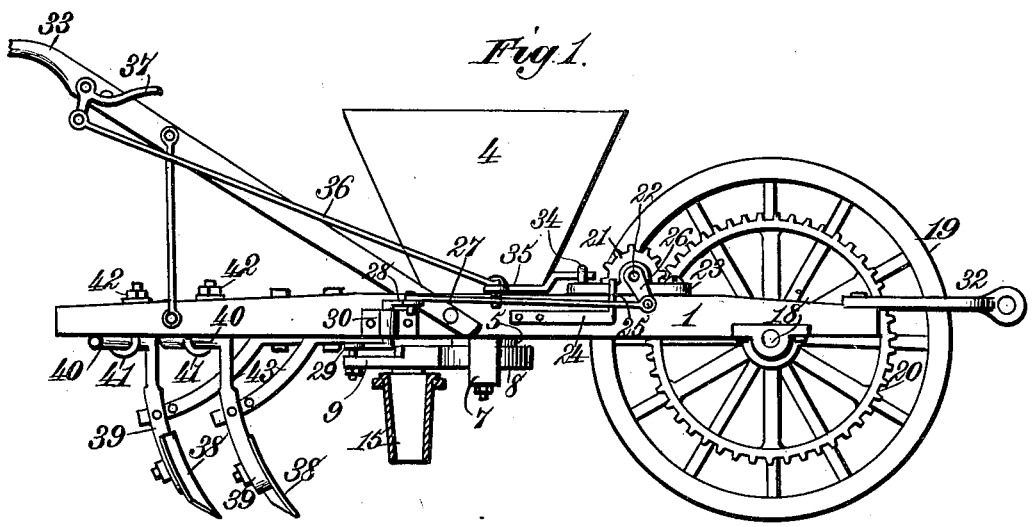

ARCH E. WADDELL AND WILLIAM A. WADDELL, OF HYATT, NORTH CAROLINA.

COMBINED FERTILIZER-DISTRIBUTER AND PLOW.

SPECIFICATION forming part of Letters Patent No. 621,184, dated March 14, 1899.

Application filed November 16, 1898. Serial No. 696,626. (No model.)

*To all whom it may concern:*

Be it known that we, ARCH E. WADDELL and WILLIAM A. WADDELL, citizens of the United States, residing at Hyatt, in the county of Anson and State of North Carolina, have invented new and useful Improvements in a Combined Fertilizer-Distributer and Plow, of which the following is a specification.

This invention relates to a combined fertilizer-distributer and plow; and it has for its object to provide in a machine of the character referred to improved means for sowing the fertilizer in the ground and for regulating the quantity of fertilizer so sown.

It has for its further object to provide improved means for throwing the fertilizer-distributing mechanism into and out of operation.

It has for a still further object to provide improved means for adjusting the plow-standards toward and from each other and regulating the furrow plowed thereby; and, finally, it has for its object to improve and simplify the construction and render more efficient the operation of this class of machines generally.

To these ends our invention consists in the features and in the construction, combination, and arrangement of parts hereinafter described, and particularly pointed out in the claims following the description, reference being had to the accompanying drawings, forming a part of this specification, wherein—

Figure 1 is a side elevation of our improved machine. Fig. 2 is a bottom plan view thereof. Fig. 3 is a detail view illustrating the means for throwing the vibrating mechanism into and out of operation, and Fig. 4 is a detail sectional view of the distributing mechanism.

Referring to the drawings, the numeral 1 indicates two parallel plow-beams, which form the principal portion of the machine-frame. Said beams are connected at their rear ends by a cross-bar 2 and at a point between their ends by a cross-bar 3. Fixed between the beams 1, preferably immediately in rear of the cross-bar 3, is a fertilizer-hopper 4, to the bottom of which is fixed an annular depending metallic flange 5, provided at its rear side with an aperture or cut-away portion 6. Attached to the under side of the beams 1, beneath the hopper, is a transverse beam 7, and pivoted to said beam is a distributer-disk 8, provided with a rearwardly-projecting arm or extension 9. As shown, the distributer-disk 8 is pivoted between the beam 7 and the annular flange 5 by a pivot-bolt 10, and in order to prevent the escape of any fertilizer between said flange and disk, excepting through the feed-aperture, as hereinafter explained, we provide a flange 11, attached to the edge of the feed-disk and extending down the opposite edges of the arm or extension 9 for a suitable distance, at which point the ends of the flange are extended transversely across and attached to the upper side of the arm or extension, as shown at 12. A groove or feed-channel 13 is formed in the upper side of the distributer-disk and its arm or extension and extends from a point near the center of the disk to near the ends 12 of the arm or extension, where it terminates in a feed-aperture 14, extending entirely through said arm or extension. A feed spout or shoe 15 is arranged directly beneath the feed-aperture 14 and operates to deposit the fertilizer dropped through the latter into the furrow. Formed in the rear side of the hopper 4, immediately over the aperture 6 in the flange 5, is an elongated opening 16, adapted to be closed by a slide or gate 17 for regulating the discharge of the fertilizer from the hopper in the manner hereinafter described.

Journaled in the forward ends of the beams 1 is a shaft 18, fixed centrally on which is a ground or drive wheel 19, adapted to travel in the furrow and rotate the shaft 18. Fixed on the shaft 18, adjacent to one of the plow-beams 1, is a gear-wheel 20, which is adapted to gear with and rotate a relatively small pinion 21. As shown, the pinion is fixed on the inner end of a short shaft 22, journaled in a movable journal-box 23. The journal-box 23 is pivoted at its forward end to the plow-beam and is held in alinement with said beam, so as to keep the pinion 21 in gear with the gear-wheel 20, by a spring 24, which is attached at its rear end to said beam and at its forward end is bent upward, as at 25, and bears against the side of the box 23. On the outer end of the shaft 22 is fixed a crank 26, which is connected by a connecting-rod 27 to one end of a bell-crank lever 28 29, journaled in a suitable bearing 30 of any approved construction attached to the side of the frame. The other end 29 of the bell-crank lever is connected by a link 31 to the rear end of the arm or extension 9 of the distributer-disk.

To the forward ends of the beams 1 is attached a clevis or draft attachment 32 and to the rear ends thereof handles 33 of usual and well-known construction. To the rear end of the pivoted journal-box 23 is attached a bail 34, in which is loosely arranged the free end of a bell-crank lever 35, pivoted to the upper side of the machine-frame and connected at its other end to one end of a rod 36. The opposite end of the rod 36 is attached to one end of a crank-handle 37, pivoted to one of the handles 33 in convenient reach of the operator.

The operation of the machine constructed as above described is as follows: The fertilizer to be sown is placed in the hopper 4, and the gate or slide 17 is adjusted vertically to control the size of the opening 16, and thus regulate the quantity of fertilizer sown in a well-known manner. As the machine is drawn along the furrow the drive-wheel 19 is rotated and communicates motion to the gear-wheel 20 and pinion 21, and the latter by means of the crank 26, connecting-rod 27, bell-crank lever 28 29, and link 31, communicates an oscillating movement to the arm or extension 9 and disk 8. The fertilizer is fed down by the hopper 4 onto the disk 8, and as the latter is oscillated the fertilizer is fed along the groove or channel 13 and escapes through the aperture 14 into the spout or shoe 15, by which latter it is dropped into the furrow and is afterward covered by the plows, to be hereinafter described. The flange 11 prevents any fertilizer from escaping about the edges of the feed-disk or its arm or extension and insures it being fed through the aperture 14 into the spout.

In turning the machine at the end of a furrow or in passing to and from the field it is desirable to arrest the movement of the distributing mechanism, and this is conveniently and instantly accomplished by the operator pressing down on the handle 37, thus drawing the rod 36 rearward and turning the bell-crank lever 35 in the proper direction to swing the rear end of the journal-box 23 outward against the action of the spring 24 and throw the pinion 21 out of gear with the gear-wheel 20. The ground or drive wheel 19 can then roll idly upon the ground without communicating any motion to the distributing mechanism.

After the fertilizer has been sown in the furrow it is covered by plows 38, connected with the ends of the beams 1. The plows 38 are attached to standards 39 in a well-known manner, and each of said standards is bent laterally at a right angle at its upper end, as at 40, and said laterally-bent portion is attached to the under side of the adjacent plow-beam by an eyebolt 41, which embraces said bent portion 40 and extends up through the beam, where it is securely held in place by a nut 42. To the standards 39, intermediate the ends of the latter, is attached one end of a brace or arm 43, the other end of which is pivotally attached to the under side of the plow-beam. As shown, there are two such plows, one for each beam, and by loosening the nuts 42 the standards 39 may be moved toward or away from each other to adjust the plows toward or from the center of the furrow, and thereby regulate the formation of the ridges, their size, and distance apart. Such adjustment of the standards also permits plows of different sizes to be interchangeably used.

Having described our invention, what we claim is—

1. In a fertilizer-distributer, the combination with a hopper, of an oscillating distributer-disk arranged beneath the hopper and provided with a rearwardly-extending arm, said arm having a longitudinal groove or channel formed in its upper side and terminating at its rear end in a feed-aperture extending through the arm, a spout or shoe arranged beneath the feed-aperture in the arm, and means for oscillating said arm and disk, substantially as described.

2. In a fertilizer-distributer, the combination with a hopper, of an oscillating distributing-disk arranged beneath the hopper and provided with a rearwardly-extending arm, said arm having a longitudinal groove or channel formed in its upper side and terminating at its rear end in a feed-aperture extending through the arm, a vertical flange extending around the disk and edges of the arm, a spout or shoe arranged beneath the feed-aperture in the arm, and means for oscillating said arm and disk, substantially as described.

3. In a fertilizer-distributer, the combination with a hopper, of an annular depending flange attached to the bottom of the hopper and provided with an opening at its rear side, an oscillating distributing-disk arranged beneath said flange and provided with a rearwardly-extending arm, said arm having a longitudinal groove or channel formed in its upper side and terminating at its rear end in a feed-aperture extending through the arm, a vertical flange extending around the disk and edges of the arm, a spout or shoe arranged beneath the feed-aperture in the arm, and means for oscillating said arm and disk, substantially as described.

4. In a fertilizer-distributer, the combination with a hopper, of an oscillating distributing-disk arranged beneath the hopper and provided with a rearwardly-extending arm, said arm having a longitudinal groove or channel formed in its upper side and terminating at its rear end in a feed-aperture, a feed-discharge opening formed in the rear side of the hopper above said arm, a sliding gate arranged over said opening, a spout or shoe arranged beneath the aperture in the arm, and means for oscillating said arm and disk, substantially as described.

5. In a fertilizer-distributer, the combination with a frame, of a hopper arranged thereon, an oscillating distributing-disk arranged beneath the hopper and provided with a rearwardly-extending arm, a ground-wheel mounted in the forward end of the frame, a gear-wheel arranged to rotate therewith, a pinion driven by said gear-wheel, means operated by said pinion for oscillating the arm on the distributing-disk, and mechanism controlled by the operator for throwing the pinion into and out of gear with the gear-wheel, substantially as described.

6. In a fertilizer-distributer, the combination with a frame, of a hopper arranged thereon, an oscillating distributing-disk arranged beneath the hopper and provided with a rearwardly-extending arm, a ground-wheel mounted in the forward end of the frame, a gear-wheel arranged to rotate therewith, a journal-box pivotally mounted on the frame, a pinion journaled in said box and adapted to gear with the gear-wheel, means operated by said pinion for oscillating the arm on the distributing-disk, a spring bearing against the pivoted journal-box and normally holding the pinion in gear with the gear-wheel, and mechanism controlled by the operator for swinging said journal-box to draw the pinion out of gear with the gear-wheel, substantially as described.

7. In a fertilizer-distributer, the combination with a frame and the guide-handles thereon, of a hopper supported on the frame, an oscillating distributing-disk arranged beneath the hopper and provided with a rearwardly-extending arm, a ground-wheel mounted in the forward end of the frame, a gear-wheel arranged to rotate therewith, a journal-box pivotally mounted on the frame, a pinion journaled in said box and adapted to gear with the gear-wheel, a spring bearing against the pivoted journal-box and normally holding the pinion in gear with the gear-wheel, a bell-crank lever pivoted to the frame and loosely engaging at one end the free end of the pivoted journal-box, a rod connected at one end with the other end of the bell-crank lever, and a crank-handle pivoted to one of the guide-handles and connected with the rear end of said rod, substantially as described and for the purpose specified.

8. In a fertilizer-distributer, the combination with a frame, of a hopper arranged thereon, an oscillating distributing-disk arranged beneath the hopper and provided with a rearwardly-extending arm, a ground-wheel mounted in the forward end of the frame, a gear-wheel arranged to rotate therewith, a pinion driven by said gear-wheel and provided with a crank-arm, a bell-crank lever journaled in a bearing on the frame, a connecting-rod connecting one end of said bell-crank lever with the crank-arm on the pinion, and a link connecting the other end of said bell-crank lever with the arm on the disk, substantially as described.

9. In a fertilizer-distributer, the combination with the frame comprising two parallel beams suitably braced together, and the fertilizing-distributing mechanism carried by the frame, of eyebolts vertically arranged in the rear ends of the beams and provided on their upper ends with nuts, plow-standards bent laterally at right angle at their upper ends and arranged in said eyebolts, and brace-arms each pivotally connected at one end to one of the plow-standards and at its opposite end to the adjacent beam, substantially as described.

In testimony whereof we have hereunto set our hands in presence of two subscribing witnesses.

ARCH E. WADDELL.
WILLIAM A. WADDELL.

Witnesses:
JOS. I. DUNLAP,
W. J. HUNTLEY.